US012695888B2

(12) United States Patent
Jun

(10) Patent No.: US 12,695,888 B2
(45) Date of Patent: Jul. 28, 2026

(54) IMAGE PROCESSING DEVICE AND OPERATING METHOD THEREOF

(71) Applicant: SAMSUNG ELECTRONICS CO., LTD., Suwon-si (KR)

(72) Inventor: Sungho Jun, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 13 days.

(21) Appl. No.: 18/612,060

(22) Filed: Mar. 21, 2024

(65) Prior Publication Data

US 2024/0323407 A1 Sep. 26, 2024

(30) Foreign Application Priority Data

Mar. 24, 2023 (KR) ........................ 10-2023-0039159
May 11, 2023 (KR) ........................ 10-2023-0061345

(51) Int. Cl.
*H04N 19/184* (2014.01)

(52) U.S. Cl.
CPC .................................. *H04N 19/184* (2014.11)

(58) Field of Classification Search
CPC .... H04N 19/13; H04N 19/176; H04N 19/184; G10L 19/0017; H03M 7/40
See application file for complete search history.

(56) References Cited

U.S. PATENT DOCUMENTS 6,658,159 B1 12/2003 Taubman
7,617,110 B2 * 11/2009 Kim .................... G10L 19/0017
704/201

| | | | |
|---|---|---|---|
| 7,660,720 | B2 * | 2/2010 | Oh ...................... G10L 19/0017 704/229 |
| 7,825,835 | B2 * | 11/2010 | Radhakrishnan ....... H03M 7/40 341/107 |
| 9,606,608 | B1 | 3/2017 | Langhammer |
| 10,127,013 | B1 | 11/2018 | Langhammer |
| 10,304,155 | B2 | 5/2019 | Chan et al. |
| 10,750,195 | B2 | 8/2020 | Choi et al. |
| 10,841,615 | B2 * | 11/2020 | He ...................... H04N 19/597 |
| 11,095,876 | B2 | 8/2021 | Jun et al. |
| 2016/0295214 | A1 * | 10/2016 | Gamei ................... H04N 19/91 |

(Continued)

OTHER PUBLICATIONS

_ Reduced complexity entropy coding of transform coefficients using Golomb coding; 2011. (Year: 2011).*

(Continued)

*Primary Examiner* — Luis Perez-Fuentes
(74) *Attorney, Agent, or Firm* — Fish & Richardson P.C.

(57) ABSTRACT

Provided are an image processing device and an operating method of the image processing device. An image processing device includes a multimedia intellectual property (IP) configured to process image data for pixels constituting one frame image, and an encoder configured to generate compressed data by performing compression on the image data, wherein the encoder includes a compression module and a first buffer. The compression module is configured to generate first compressed data by performing compression on the first image data including a most significant bit (MSB) of the image data, and the first buffer is configured to store second image data containing a least significant bit (LSB) of the image data, in order to skip compression for the second image data.

16 Claims, 14 Drawing Sheets

(56)                    References Cited

U.S. PATENT DOCUMENTS

| | | |
|---|---|---|
| 2018/0084281 A1 | 3/2018 | Hsieh et al. |
| 2018/0316938 A1* | 11/2018 | dela Serna ............. H04N 19/91 |
| 2019/0068981 A1* | 2/2019 | Chong ................. H04N 19/184 |
| 2019/0082185 A1 | 3/2019 | Satavalekar et al. |
| 2022/0201340 A1 | 6/2022 | Lee et al. |
| 2024/0121387 A1* | 4/2024 | Lainema ................ H04N 19/42 |

OTHER PUBLICATIONS

_ Golomb coding—Wikipedia—2019. (Year: 2019).*
_ Improved CABAC—Marpe—2001. (Year: 2001).*
Extended European Search Report in European Appln. No. 24164369.
1, mailed on Sep. 5, 2024, 6 pages.

\* cited by examiner

| x | KV = 0 | KV = 1 | KV = 2 | KV = 3 | KV = 4 |
|---|--------|--------|--------|--------|--------|
| 0 | 1 | 10 | 100 | 1000 | 10000 |
| 1 | 010 | 11 | 101 | 1001 | 10001 |
| 2 | 011 | 0100 | 110 | 1010 | 10010 |
| 3 | 00100 | 0101 | 111 | 1011 | 10011 |
| 4 | 00101 | 0110 | 01000 | 1100 | 10100 |
| 5 | 00110 | 0111 | 01001 | 1101 | 10101 |
| 6 | 00111 | 001000 | 01010 | 1110 | 10110 |
| 7 | 0001000 | 001001 | 01011 | 1111 | 10111 |
| 8 | 0001001 | 001010 | 01100 | 010000 | 11000 |
| 9 | 0001010 | 001011 | 01101 | 010001 | 11001 |

OPTIMIZED KV

FIG. 5B

OPTIMIZED KV

| x | KV = 0 | KV = 1 | KV = 2 | KV = 3 | KV = 4 |
|---|--------|--------|--------|--------|--------|
| 0 | 0 | 00 | 000 | 0000 | 00000 |
| 1 | 10 | 01 | 001 | 0001 | 00001 |
| 2 | 110 | 100 | 010 | 0010 | 00010 |
| 3 | 1110 | 101 | 011 | 0011 | 00011 |
| 4 | 11110 | 1100 | 1000 | 0100 | 00100 |
| 5 | 111110 | 1101 | 1001 | 0101 | 00101 |
| 6 | 1111110 | 11100 | 1010 | 0110 | 00110 |
| 7 | 11111110 | 11101 | 1011 | 0111 | 00111 |
| 8 | 111111110 | 111100 | 11000 | 10000 | 01000 |
| 9 | 1111111110 | 111101 | 11001 | 10001 | 01001 |

| $choice_i$ | $p_i$ | $encoding$ |
|:---:|:---:|:---:|
| "A" | 1/3 | 11 |
| "B" | 1/2 | 0 |
| "C" | 1/12 | 100 |
| "D" | 1/12 | 101 |

B→0
A→11
C→100
D→101

010011011101
B  C  A B A D

Expected length of this encoding:

(2)(1/3) + (1)(1/2) + (3)(1/12)(2) = 1.667 bits

Expected length for 1000 symbols:

- With fixed-length, 2 bits/symbol = <u>2000</u> bits
- With variable-length code = <u>1667</u> bits

FIG. 13A

| 24-bit INPUT | COMPRESSION RATIO (%) |
|---|---|
| LSB 10-bit | 0.71 |
| LSB 12-bit | 2.19 |
| LSB 14-bit | 6.12 |

FIG. 13B

| 24-bit INPUT | COMPRESSION RATIO (%) | HW IMPLEMENTATION |
|---|---|---|
| MSB 16-bit +<br>8bit BYPASS BUFFER | 25.19 | 1 core + 8-bit BUFFER |
| MSB 12-bit +<br>12-bit BYPASS BUFFER | 25.21 | 1 core + 12-bit BUFFER |
| MSB 12-bit +<br>LSB 12-bit | 26.31 | 2 core |

IMAGE PROCESSING DEVICE AND OPERATING METHOD THEREOF

CROSS-REFERENCE TO RELATED APPLICATION

This application is based on and claims priority under 35 U.S.C. § 119 to Korean Patent Application Nos. 10-2023-0039159, filed on Mar. 24, 2023, and 10-2023-0061345, filed on May 11, 2023, in the Korean Intellectual Property Office, the disclosures of which are incorporated by reference herein in their entireties.

TECHNICAL FIELD

The inventive concept relates to an image processing device, and especially to an image processing device for efficiently processing image compression, and an operating method thereof.

BACKGROUND

The need for high-resolution video images and high-frame-rate images is emerging, and as the areas of application of image processing devices increase, the application areas are expanding not only to mobile devices but also to various devices (e.g., automotive display devices). In particular, in recent years, the amount, that is, the bandwidth, in which several multimedia intellectual properties (IPs), such as multimedia circuits, of an image processing device access a memory, has greatly increased. As the bandwidth increases, the processing power of the image processing device reaches its limit, causing a problem of slowing down during video image recording and playback operations, and an image processing device having greater processing power may be needed to improve the processing power limit. Accordingly, when the multimedia IP accesses the memory, a method of compressing the size of data is considered. For example, data may be compressed before writing data to memory, and compressed data may be decompressed after reading data from memory. A lossless compression method (e.g., entropy coding) for compressing a high-resolution image without loss of data may be used. In the case of lossless compression (e.g., entropy coding), the compression ratio varies from data to data depending on variable length coding, so parallel data processing may be difficult, which may reduce the data processing speed.

SUMMARY

One or more implementations of this disclosure provide an image processing device and an operating method of the image processing device that performs optimized image data compression based on a lossless compression method for high-resolution images.

The features and advantages of implementations are not limited to the those mentioned above, and other features and advantages not mentioned may be clearly understood by those of ordinary skill in the art from the following description.

According to an aspect of the disclosure, there is provided an image processing device including a multimedia intellectual property (IP) configured to process image data for pixels constituting one frame image, and an encoder configured to generate compressed data by performing compression on the image data, wherein the encoder includes a compression module and a first buffer, wherein the compression module may be configured to generate first compressed data by performing compression on the first image data including the most significant bit (MSB) of the image data, and the first buffer may be configured to store second image data containing a least significant bit (LSB) of the image data in order to skip compression for the second image data.

According to another aspect of the disclosure, there is provided an operating method of the image processing device for processing image data for pixels constituting one frame image, the operating method including the operations of generating first compressed data by performing compression of first image data including a most significant bit (MSB) of the image data, storing second image data including the least significant bit (LSB) of the image data in a buffer to skip compression of the second image data, and generating compressed data by merging the first compressed data with the second image data.

According to another aspect of the disclosure, there is provided an image processing device including a memory, and a multimedia module configured to process image data for pixels constituting one frame image, wherein the multimedia module may be configured to perform compression on first image data including the most significant bit (MSB) of the image data, skip compression on second image data including the least significant bit (LSB) of the image data, and write compressed data generated by merging the compressed first image data with the second image data in the memory.

BRIEF DESCRIPTION OF THE DRAWINGS

Implementations of the disclosure will be more clearly understood from the following detailed description taken in conjunction with the accompanying drawings in which:

FIG. 1 is a block diagram illustrating an image processing device according to some implementations;

FIGS. 5A and 5B are diagrams illustrating operations of an image processing device according to some implementations;

FIG. 13A shows a table comparing the compression ratio of LSB according to some implementations, and FIG. 13B shows a table comparing performance according to a configuration of an encoder according to some implementations.

DETAILED DESCRIPTION

Hereinafter, implementations of this disclosure have been described with reference to the accompanying drawings, but those of ordinary skill in the art will understand that this disclosure may be implemented in other specific forms without changing its technical ideas or essential features. Therefore, it should be understood that the implementations described below are examples in all respects and are not limited.

Figure 1:
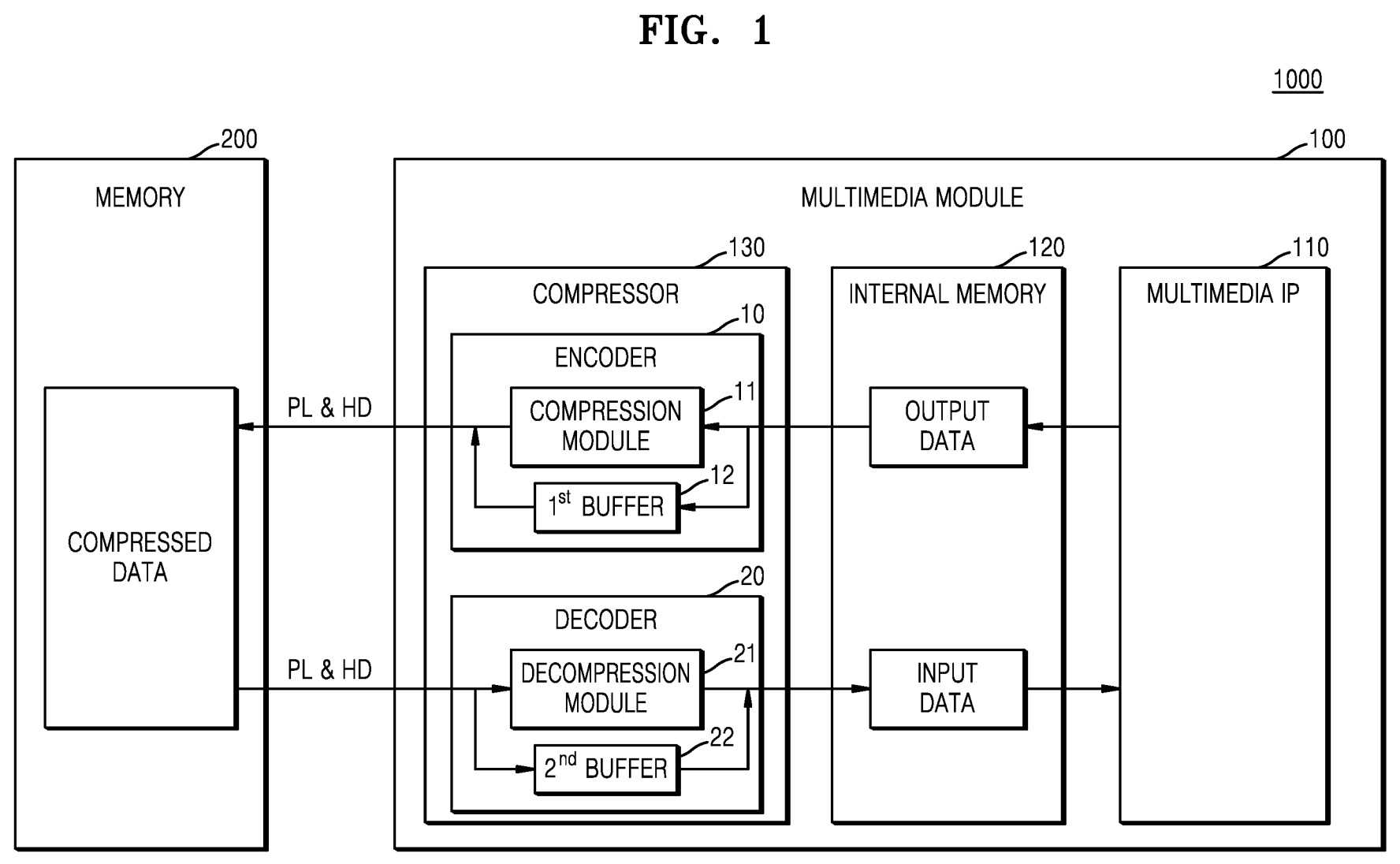

FIG. 1 is a block diagram illustrating an image processing device according to some implementations.

The image processing device 1000 includes a multimedia module 100 and a memory 200, and the multimedia module 100 may include a multimedia IP 110, an internal memory 120, and a compressor 130.

Figure 2:
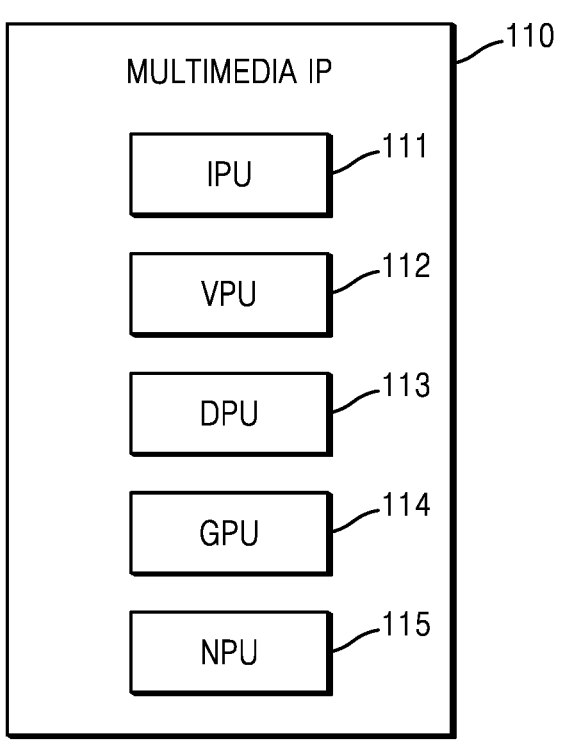
FIG. 2 is a block diagram illustrating a multimedia intellectual property (IP) according to some implementations.

The multimedia IP 110 may perform image processing for received input data (e.g., video or still images as image data, raw image data, etc.) to change the image quality, format, or the like, or perform image processing for received input data to display the input data on a display. The multimedia IP 110 may receive image data from an external device, for example, the memory 200 or a camera. As shown in FIG. 2, the multimedia IP 110 includes a plurality of IPs, and each of the plurality of IPs may receive image data from an external device or another IP.

FIG. 2 is a block diagram illustrating a multimedia intellectual property (IP) according to some implementations.

Referring to FIG. 2, the multimedia IP 110 includes at least one of an image processing unit (IPU) 111, a video processing unit (VPU) 112, a display processing unit (DPU) 113, a graphics processing unit (GPU) 114, and a neural network processing unit (NPU) 115. The IPU 111, the VPU 112, the DPU 113, the GPU 114, and the NPU 115 may be implemented in hardware such as a logic circuit, a field-programmable gate array (FPGA), a microprocessor, or the like, or a combination of hardware and software (firmware).

The image processing unit 111 may change the format of the received image data or correct the image quality of the image data.

For example, the IPU 111 may receive red-green-blue (RGB) image data as input data and convert it into luminance-chrominance (e.g., luminance-blue or luminance-red) (YUV) image data. In this case, the RGB type data means a data format in which colors are expressed based on three primary colors of light. That is, the RGB type color expression method is a method of expressing an image using three types of colors: red (RED), green (GREEN), and blue (BLUE). In contrast, the YUV type color expression method refers to a data format for expressing colors which are split into a brightness signal, that is, a luma signal, and a chroma signal. That is, Y denotes a luminance signal, and U(Cb) and V(Cr) denote color difference signals, that is, chroma signals, respectively. U denotes a difference between the luminance signal and the blue signal component, and V denotes a difference between the luminance signal and the red signal component. Here, items of Y, U(Cb), and V(Cr) may be defined as planes. Since the human eye is sensitive to luminance signals but less sensitive to color signals, YUV-style data may be easier to compression than RGB-style data.

For example, the IPU 111 may correct the image quality of received image data by performing image processing such as adjusting the gamma value of the received image data, adjusting the luminance, widening the Dynamic Range (DR), or removing the noise.

The VPU may correct the quality of received video image or record and play back images such as camera-recording (or camcording), play back, and the like of the video image.

The DPU 113 may perform image processing for displaying the received image data on the display. The received image may be displayed on the display. For example, the DPU 113 may change the format of the received image data to a format suitable for displaying on the display, or correct the image data based on the gamma value corresponding to the display.

The GPU 114 may calculate and generate two-dimensional or three-dimensional graphics. The GPU 114 may be specialized for processing graphics data to process graphics data in parallel.

The NPU 115 may perform image processing on image data received on the basis of a trained neural network, derive a plurality of features from the image data, and recognize an object, a background, and the like included in the image data on the basis of the plurality of features. The NPU 115 may be specialized for operation of the neural network to process the image data in parallel.

The multimedia IP 110 may further include IPs such as an image signal processor (ISP), a shaking correction module (G2D), and a multi-format codec (MFC).

Subsequently, referring to FIG. 1, the internal memory 120 may temporarily store output data (e.g., output image data) output from the multimedia IP 110 or input data (e.g., input image data) input to the multimedia IP 110. The internal memory 120 may be implemented as a static dynamic random access memory (SRAM), a cache, a frame buffer, or the like.

The compressor 130 includes an encoder 10 and a decoder 20. The encoder 10 may include a compression module 11 and a first buffer 12, and the decoder 20 may include a decompression module 21 and a second buffer 22. The compressor 130 may compress output image data output from the multimedia IP 110 and write (or store) compressed data to the memory 200, read compressed data from the memory 200, decompress the read compressed data, and provide the decompressed data to the multimedia IP 110 as input data. The image data may be divided into a plurality of blocks each having the same size, and the compressor 130 may perform compression and decompression in block units. Hereinafter, "compression with respect to image data" means compressing image data in units of blocks. In addition, "compressed data" corresponds to one block of image data.

Although not illustrated, the compressor 130 may write compressed data into the memory 200 or read compressed data from the memory 200 through a Direct Memory Access (DMA) circuit.

The encoder 10 may split the received image data into first image data including a most significant bit (MSB) of the image data and second image data including a least significant bit (LSB) of the image data.

The encoder 10 may perform compression on the first image data including the most significant bit (MSB) of the image data through the compression module 11 to generate first compressed data, and store second image data including the LSB of the image data through the first buffer 12. For example, the encoder 10 may perform compression on first compressed data corresponding to the most significant bit (MSB) of the image data, and store the second image data corresponding to the least significant bit (LSB) of the image data in the first buffer 12 without performing compression, thereby bypassing the second image data in the encoder 10. The most significant bit (MSB) of the image data may be determined as a difference value obtained by subtracting the least significant bit (LSB) of the image data from the total number of bits of the image data. Alternatively, the least significant bit (LSB) of the image data may be determined as a difference value obtained by subtracting the most significant bit (MSB) of the image data from the total number of bits of the image data.

The encoder 10 may perform lossy compression or lossless compression on received image data (e.g., output data of the multimedia IP 110). Here, the lossless compression means compressing data without loss of data, and a compression ratio varies according to data. In contrast, the lossy compression means a compression in which data is partially lost, and may have a higher compression ratio than lossless compression and may have a preset compression ratio (for example, a fixed compression ratio). The lossy compression may include a quantization step based on a quantization step size (or quantization step value) and at least one other compression process. The larger the quantization step size, the greater the data loss, and a quantization error may occur.

Meanwhile, the compression module 11 of the encoder 10 according to some implementations may perform lossless compression on image data on the basis of entropy coding.

The compression module 11 may select an optimized compression parameter (e.g., a K-parameter) for a block of the first image data, and repeatedly perform a compression process for each block of the first image data on the basis of the selected compression parameter.

When compression is completed with respect to the first image data, the encoder 10 may store, in the memory 200, a payload PL generated by merging the first compressed data, which has been compressed with respect to the first image data, with the second image data.

The encoder 10 may generate a payload PL including first compressed data and second image data, and a header HD including an index indicating a compression ratio for the first compressed data. The encoder 10 may write compressed data, in other words, a payload PL and a header HD, to the memory (200) by transmitting, to the memory (200), the payload PL, the header HD, and an address in which the payload PL and the header HD are stored. In the case of lossless compression, the compression ratio of compressed data may vary.

When writing compressed data into memory 200, the encoder 10 may provide the decoder 20 with information that may be used to decompress compressed data in the future by writing a header HD including an index containing a compression ratio (or size of compressed data), for example, a header index, into the memory 200.

The decoder 20 may read the compressed data stored in the memory 200 and perform decompression on the compressed data. The decoder 20 may read the payload PL and the header HD for the compressed data and determine the compression ratio (or size of the compressed data) of the compressed data based on the header index included in the header HD. In addition, the decoder 20 may determine a decompression method according to the compression ratio (or the size of the compressed data) of the compressed data.

The decoder 20 may split the read payload of the compressed data into the first compressed data corresponding to the most significant bit (MSB) of the image data and the second image data corresponding to (or including) the least significant bit (LSB) of the image data.

The decoder 20 may restore the first image data by performing decompression on the first compressed data corresponding to the most significant bit (MSB) of the image data through the decompression module 21, and store the second image data corresponding to (or including) the least significant bit (LSB) of the image data through the second buffer 22. For example, the decoder 20 may perform decompression on the first compressed data corresponding to the most significant bit (MSB) of the image data, and store the second image data in the second buffer 22 without decompressing the second image data corresponding to the least significant bit (LSB) of the image data, thereby bypassing the second image data in the decoder 20.

The decoder 20 may output, to the multimedia IP 110, output data generated by merging the restored first image data with the second image data.

The memory 200 may store compressed data. The memory 200 may be implemented as a volatile memory such as a Dynamic Random Access Memory (DRAM), or a resistive memory such as a Ferroelectric RAM (FeRAM), a Resistive RAM (ReRAM), a Phase Change RAM (PRAM), or a Magnetic RAM (MRAM). The memory 200 may be implemented as a last level cache. Hereinafter, the memory 200 will be described assuming that it is DRAM.

In FIG. 1, the first buffer 12 is shown to be arranged outside the compression module 11, but this is for convenience of explanation and is not limited thereto. The first buffer 12 according to some implementations may be arranged inside the compression module 11. In addition, the second buffer 22 is shown to be arranged outside the decompression module 21, but this is for convenience of explanation and is not limited thereto, and the second buffer 22 according to some implementations may be arranged inside the decompression module 21.

According to operations of the encoder 10 and the decoder 20 according to some implementations, compression and/or decompression is performed only on the first image data including the most significant bit (MSB) with high correlation between the peripheral image data, and the second image data including the least significant bit (LSB) having a low correlation between peripheral image data is bypassed to generate compressed data and/or decompressed data, and thus, compression and/or decompression of image data may be efficiently performed without lowering the speed of image processing with respect to a high-resolution image.

Figure 3:
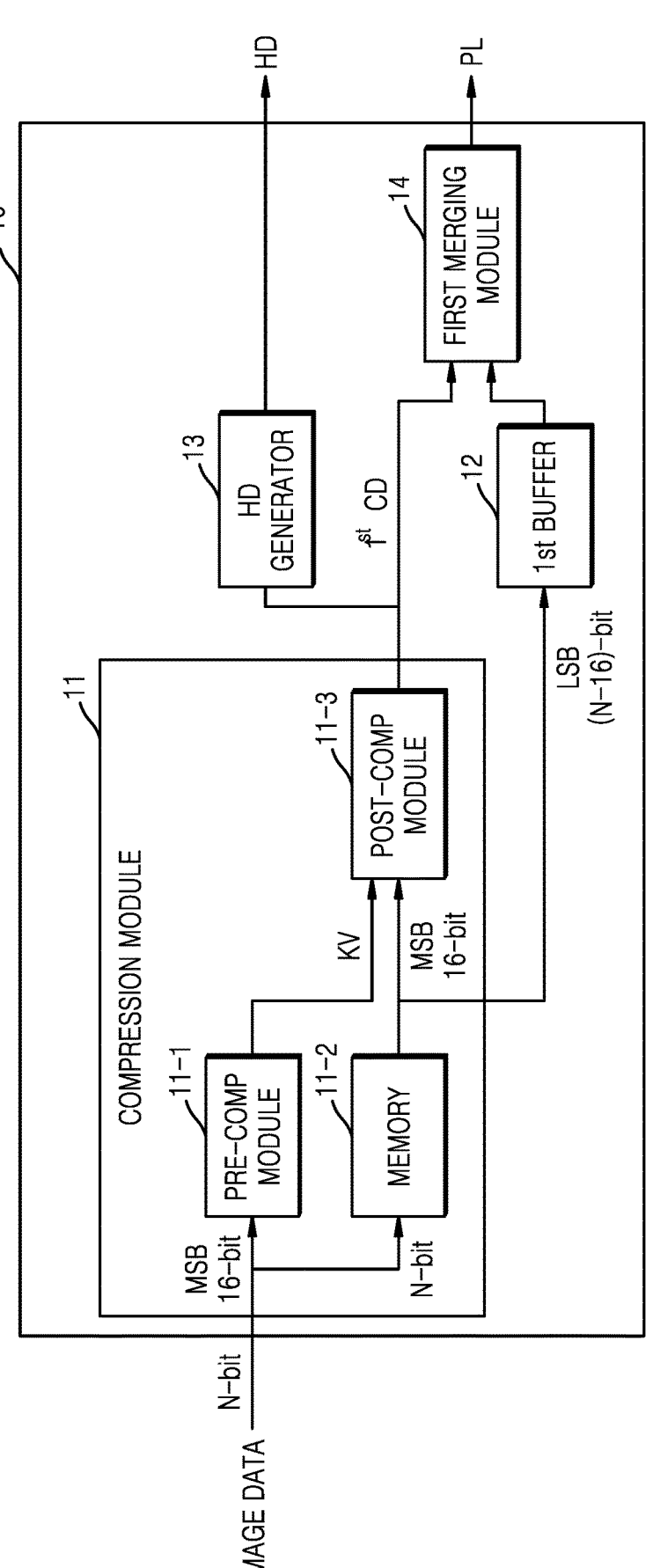
FIG. 3 is a block diagram schematically illustrating an encoder according to some implementations.

FIG. 3 is a block diagram schematically illustrating an encoder according to some implementations.

Specifically, FIG. 3 is a block diagram for describing a compression operation of image data through the compression module 11 and the first buffer 12 of the encoder 10 of FIG. 1.

In FIG. 3, it is assumed that the input image data includes N bits, the MSB data in the image data includes 16 bits, and the LSB data of the image data includes (N–16) bits. The most significant bit (MSB) of the image data may be determined as a difference value obtained by subtracting the least significant bit (LSB) of the image data from the total number of bits of the image data. Alternatively, the least significant bit (LSB) of the image data may be determined as a difference value obtained by subtracting the most significant bit (MSB) of the image data from the total number of bits of the image data.

Referring to FIG. 3, for compression of image data, the encoder 10 includes a compression module 11, a first buffer 12, an HD generator 13, and a first merging module 14. Each of the compression module 11, the first buffer 12, the HD generator 13, and the first merging module 14 may be implemented in hardware or may be implemented in a combination of hardware and software (or firmware).

The compression module 11 includes a pre-compression module 11-1, a memory 11-2 and a post-compression module 11-3.

The pre-compression module 11-1 may divide image data in block units and output compression parameters (e.g., K value (hereinafter referred to as KV)) corresponding to each of multiple blocks to the post-compression module 11-3. For example, the pre-compression module 11-1 may select (or determine) an optimized compression parameter (e.g., K value KV) for each of multiple blocks using a lookup table for KV of Golomb coding or Golomb rice coding.

The pre-compression module 11-1 may divide the received data, such as image data (or data obtained by dividing image data into block units), into prediction data and residual data. For example, when one pixel has a value of 0 to $2^{16}-1$, 16-bit data per pixel may be required to express the data having the pixel value of 0 to $2^{16}-1$. Accordingly, when an adjacent pixel has a similar value, there is no loss of data even when only a difference between adjacent pixels, that is, residual, is represented, and the number of data bits for expressing a pixel may be reduced. For example, when a pixel having values of (253, 254, 255) is continuous, if the prediction data is 253, a residual data representation of (253 (prediction), 1 (residual), 2 (residual)) may be sufficiently expressed, and the number of bits per pixel for the residual data representation may be very small to 2 bits. In particular, since the pre-compression module 11-1 according to some implementations divides the most significant bit (MSB) data of image data into prediction data and residual data, the number of data bits for expressing a pixel may be significantly reduced. In the compression of the image data, the higher the correlation between pieces of the peripheral data, the higher the compression ratio, thereby enabling efficient compression, while the lower the correlation between pieces of the peripheral data, the lower the compression ratio. Therefore, the pre-compression module 11-1 according to some implementations may select a compression parameter based on the MSB data having a high correlation between pieces of peripheral data in the image data.

The pre-compression module 11-1 may select and output a block-specific compression parameter KV based on each block-specific prediction data and residual data for the MSB data of image data. A detailed description thereof will be described with reference to FIGS. 4 to 6, which will be described later.

Accordingly, the compression module 11 according to some implementations may compress the overall size of the data by dividing the MSB data of the image data into prediction data and residual data. In this case, various methods may be possible for determining what value the prediction data is.

The post-compression module 11-3 may receive a compression parameter for each block for the MSB data of the image data from the pre-compression module 11-1, and receive the MSB data of 16 bits in the input image data of N bits output from the memory 11-2 (e.g., SRAM). The post-compression module 11-3 may perform lossless compression on the MSB data of the input image data of N bits based on the compression parameter KV for each block. For example, the post-compression module 11-3 may compress the MSB data of the input image data of N bits through entropy coding. In this case, entropy coding may utilize a method of allocating the number of bits according to the frequency.

The post-compression module 11-3 may compress MSB data using the Huffman coding. Alternatively, the post-compression module 11-3 may compress the MSB data of the input image data through Golomb coding or Golomb rice coding. In this case, the post-compression module 11-3 may generate a table through the KV, thereby simply compressing the MSB data of the image data. A detailed description thereof will be described with reference to FIGS. 4 to 6, which will be described later.

The post-compression module 11-3 may transmit the first compressed data 1st CD, which is data in which the MSB data of the image data is compressed, to the HD generator 13 and the first merging module 14.

The HD generator 13 may generate a header HD indicating a compression ratio (or a size of the first compressed data 1st CD) of the first compressed data 1st CD. Here, the header HD may include a header index HDI, and the header index HDI may indicate a compression ratio (or a size of the compressed data CD) of the compressed data CD.

The memory 11-2 (e.g., SRAM) may store, in the first buffer 12, the LSB data ((N−16)-bit) of the image data. The LSB data in the image data may be stored in the first buffer 12 to bypass the encoder 10 without performing compression because of the low correlation between pieces of peripheral data.

The first merging module may generate a payload PL by merging the first compressed data 1 st CD) received from the post-compression module 11-3 and the LSB data of (N−16) bits received from the first buffer 12.

The encoder 10 may generate compressed data including a header HD and a payload PL, and may transmit the compressed data to the memory 200 to be stored therein.

A compression controller may control operations of the pre-compression module 11-1, the memory 11-2, and the post-compression module 11-3, and may control a compression process. The compression controller may receive control signals and control operations of the pre-compression module 11-1, the memory 11-2, and the post-compression module 11-3 based on the control signals. In this case, the control signals may be provided from the multimedia IP 110 according to a setting of an application executing the multimedia IP 110 (for example, whether the application requires a high image quality, a high compression ratio, or the like). For example, the compression controller may receive values set in a firmware register of the multimedia IP 110 as control signals.

The compression controller may also determine a footprint of a region in which the compressed data CD is to be stored in the memory 200, and determine an address (e.g., a logical address) of the memory 200 in which the compressed data CD is to be stored. The compression controller may determine the footprint to be an integer multiple of an access unit of the memory 200.

Figure 4:
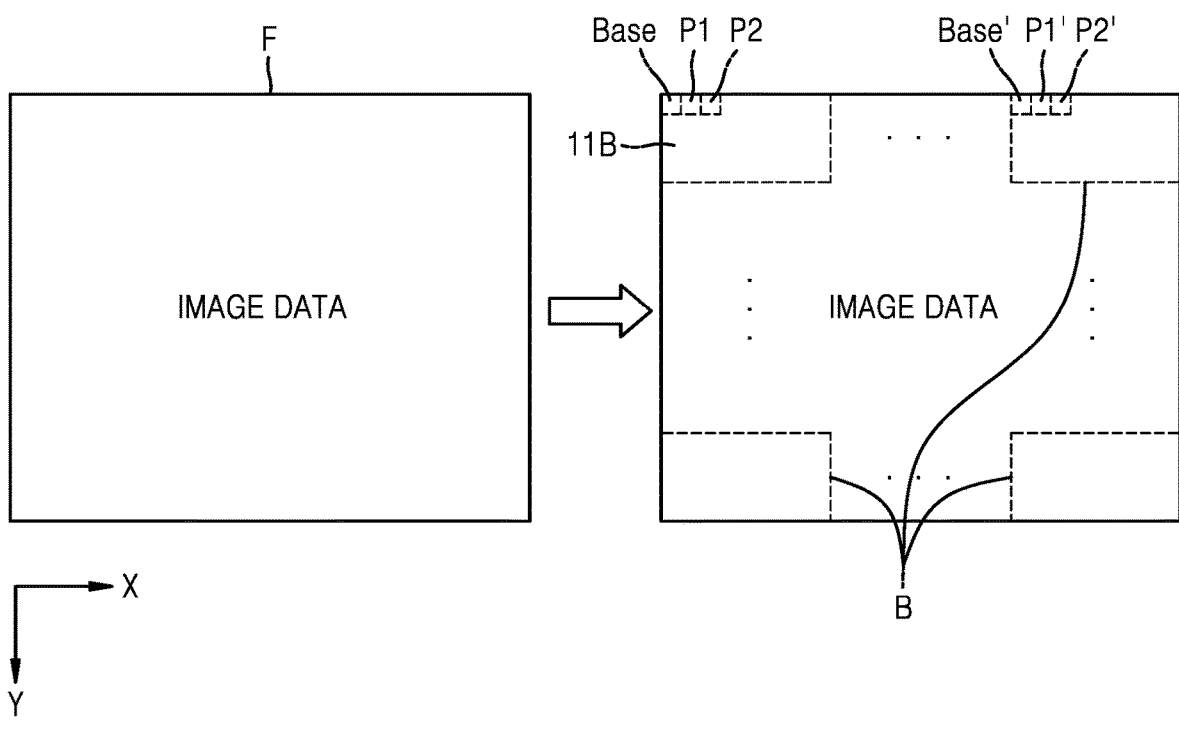
FIG. 4 is a diagram illustrating an operation of an image processing device according to some implementations.

FIG. 4 is a diagram illustrating an operation of an image processing device according to some implementations.

In detail, FIG. 4 is a diagram illustrating image data input to the encoder 10 of FIG. 3.

Referring to FIG. 4, the image data includes data for one frame image F. The image data includes a plurality of pieces of block image data 11B, and the plurality of pieces of block image data 11B may mean image data for each block B constituting the frame image F.

The size of each block B may have, in various implementations, 64×4, 16×4, or 4×4 pixels, for example. The block image data 11B according to some implementations may include image data of 64×4 pixels. Each block image data 11B may include image data for reference pixels Base and Base' and image data for adjacent pixels P1, P2, P1' and P2'. Each pixel may constitute a frame image. Data bits per pixel may vary according to some implementations.

The encoder 10 may perform a compression operation by encoding in units of blocks B, and the decoder 20 may also perform a decompression operation by decoding in units of a plurality of pieces of block image data 11B. For example, one frame image F may be divided into a first block BLK0 to a sixteenth block BLK15 (not shown). For example, the encoder 10 performs compression sequentially from the first block BLK0 to the sixteenth block BLK15 or in parallel with respect to several blocks, and the decoder 20 may perform decompression sequentially from the first block BLK0 to the sixteenth block BLK15 or in parallel with respect to several blocks.

FIGS. 5A and 5B are diagrams illustrating an operation of an image processing device according to some implementations.

In detail, FIG. 5A and FIG. 5B are diagrams illustrating tables for KVs used by the pre-compression module 11-1 of the encoder 10 of FIG. 3.

The post-compression module 11-3 of the encoder 10 of FIG. 3 may perform efficient compression through a lossless compression method (e.g., entropy coding) that allocates the number of bits according to the frequency of occurrence of residual data. In this case, the pre-compression module 11-1 may select (or determine) a KV to be used for entropy coding based on prediction data and residual data for the MSB data for each block of image data.

The vertical columns of the tables shown in FIGS. 5A and 5B represent KV, and the horizontal rows represent residual data (e.g., symbol) generated in advance for the MSB data for each block according to each KV.

Referring to FIG. 5A, the pre-compression module 11-1 may select (or determine) an optimized KV for the MSB data for each block based on a pre-generated table (e.g., FIG. 5A), based on the Golomb coding algorithm, which is one of algorithms for lossless compression. For example, it is assumed that "7" exists at the highest frequency in the residual data of the first block image data. When KV is "0", the data corresponding to the residual data "7" is "0001000" (7-bit). When KV is "1", the data corresponding to the residual data "7" is "001001" (6-bit). When KV is "2", the data corresponding to the residual data "7" is "01011" (5-bit). When KV is "3", the data corresponding to the residual data "7" is "1111" (4-bit). When KV is "4", the data corresponding to the residual data "7" is "10111" (5-bit). Therefore, the pre-compression module 11-1 may select the KV with the least size of data corresponding to the residual data "7", that is, when the KV is "3", as the KV optimized for the first block.

Referring to FIG. 5B, the pre-compression module 11-1 may select (or determine) an optimized KV for the MSB data for each block based on a pre-generated table (e.g., FIG. 5B), based on the Golomb rice coding algorithm, which is one of algorithms for lossless compression. For example, it is assumed that "0" exists at the highest frequency in the residual data of the second block image data. When KV is "0", the data corresponding to the residual data "O" is "O" (1-bit). When KV is "1", the data corresponding to the residual data "0" is "00" (2-bit). When KV is "2", the data corresponding to the residual data "O" is "000" (3-bit). When KV is "3", the data corresponding to the residual data "0" is "0000" (4-bit). When KV is "4", the data corresponding to the residual data "0" is "00000" (5-bit). Therefore, the pre-compression module 11-1 may select the KV with the least size of data corresponding to the residual data "O", that is, when the KV is "O", as the KV optimized for the second block.

Figure 6:
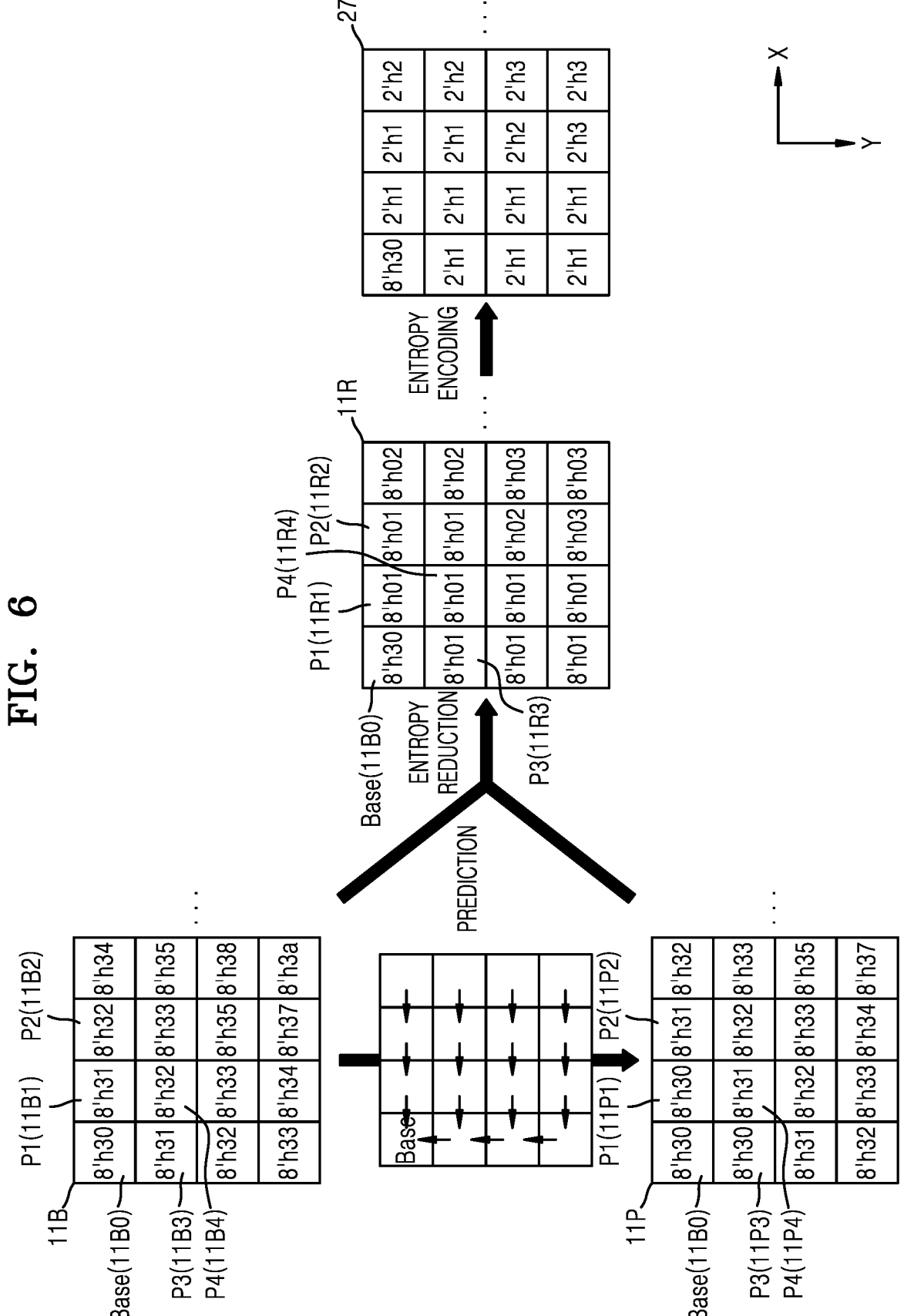
FIG. 6 is a diagram illustrating an operation of an image processing device according to some implementations.

FIG. 6 is a diagram illustrating an operation of an image processing device according to some implementations.

In detail, FIG. 6 is a diagram illustrating an operation of the compression module 11 of the encoder 10 of FIG. 1.

Referring to FIG. 6, block image data 11B includes reference block image data 11B0 of a reference pixel Base and first to fourth block image data 11B1 to 11B4 of first to fourth pixels P1-P4. In FIG. 6, the block image data may mean the MSB data of the image data of the corresponding block.

The reference pixel Base, the first pixel P1, and the second pixel P2 may be extended in the first direction X, the reference pixel Base and the third pixel P3 may be extended in the second direction Y, and the first pixel P1 and the fourth pixel P4 may be extended in the second direction Y.

The compression module 11 may perform a prediction operation on block image data 11B to form prediction data 11P, and may form residual data 11R based on the block image data 11B and the prediction data 11P. For example, the first prediction data 11P1 of the first pixel P1 may be generated based on the reference pixel Base, and the first prediction data 11P1 may be the same as the reference block image data 11B0. The second prediction data 11P2 of the second pixel P2 may be generated based on the first pixel P1, and the second prediction data 11P2 may be the same as the first block image data 11B1. The third prediction data 11P3 of the third pixel P3 may be generated based on the reference pixel Base, and the third prediction data 11P3 may be the same as the reference block image data 11B0. The fourth prediction data 11P4 of the fourth pixel P4 may be generated based on the third pixel P3, and the fourth prediction data 11P4 may be the same as the third block image data 11B3 of the third pixel P3. For example, the compression module 11 may perform a prediction operation on the MSB of the block image data 11B to form prediction data 11P, and may form residual data 11R for the MSB of the block image data 11B based on the MSB of the block image data 11B and the prediction data 11P for the MSB.

For the pixels other than the reference pixel Base, the compression module 11 may form residual data 11R by subtracting the block image data 11B from the prediction data 11P generated by the prediction operation. For example, the first residual data 11R1 of the first pixel P1 may include 1 (residual), the second residual data 11R2 of the second pixel P2 may include 1 (residual), the third residual data 11R3 of the third pixel P3 may include 1 (residual), and the fourth residual data 11R4 of the fourth pixel P4 may include 1 (residual), and the residual data 11R of another pixel in the same block may include 3 (residual).

The prediction operation of forming residual data 11R by the compression module 11 may be implemented in various ways by changing the number and arrangement of reference pixels Base according to some implementations, and the prediction operation described with reference to FIG. 6 is only an example. Some implementations are not limited to the prediction operation described with reference to FIG. 6.

The compression module 11 may generate compressed data 27 by performing a compression operation for encoding residual data 11R of pixels in a block other than a reference pixel Base through entropy coding based on a KV selected for each block in FIGS. 5A and 5B.

Figure 7:
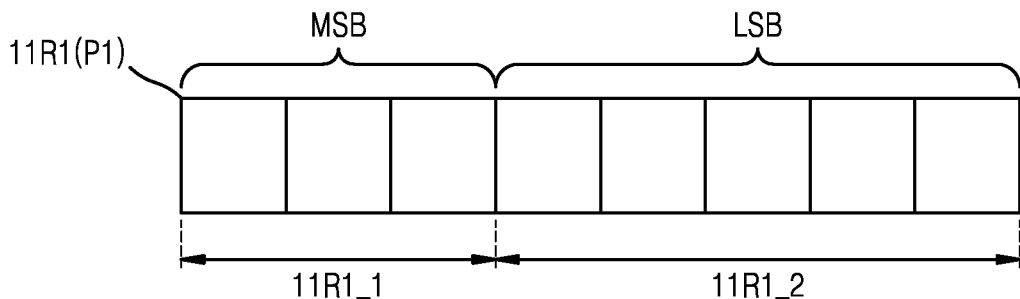
FIG. 7 is a diagram illustrating a layout of image-processed data according to some implementations.

FIG. 7 is a diagram illustrating a layout of image-processed data according to some implementations.

In detail, FIG. 7 is a diagram illustrating a layout of the first residual data 11R1 with respect to the first pixel P1 in the block of FIG. 6.

Referring to FIG. 7, the first residual data 11R1 includes (1_1)-th residual data 11R1_1 and (1_2)-th residual data 11R1_2.

The (1_1)-th residual data 11R1_1 includes the MSB of the first residual data 11R1. The (1_1)-th residual data 11R1_1 may correspond to the (1_1)-th image data including the MSB continuous from the first block image data 11B1.

The (1_2)-th residual data 11R1_2 includes the LSB of the first residual data 11R1. The (1_2)-th residual data 11R1_2 may correspond to the (1_1)-th image data including the LSB continuous from the first block image data 11B1.

The compression module 11 may perform a compression operation by performing entropy coding (e.g., Golomb coding, Golomb rice coding, or Huffman coding), which is a variable bit rate encoding method, on the MSB data of the (1_1)-th residual data 11R1_1.

The compression module 11 may store the least significant bit LSB data of the (1_2)-th residual data 11R1_2 in the first buffer 12 without performing a compression operation. That is, the compression module 11 may bypass the (1_2)-th residual data 11R1_2. The compression module 11 may generate compressed data (e.g., a payload PL of compressed data) by merging compressed data of the (1_1)-th residual data 11R1_1 with the (1_2)-th residual data 11R1_2.

The encoding of the first residual data 11R1 described above may also correspond to the encoding of residual data 11R of the remaining pixels in the block B including the second pixel P2 to the fourth pixel P4 in the block of FIG. 6. The above-described operations of the encoding of the first residual data 11R1 of the first pixel P1 can likewise apply to the encoding of the residual data 11R of the remaining pixels.

Figure 8:
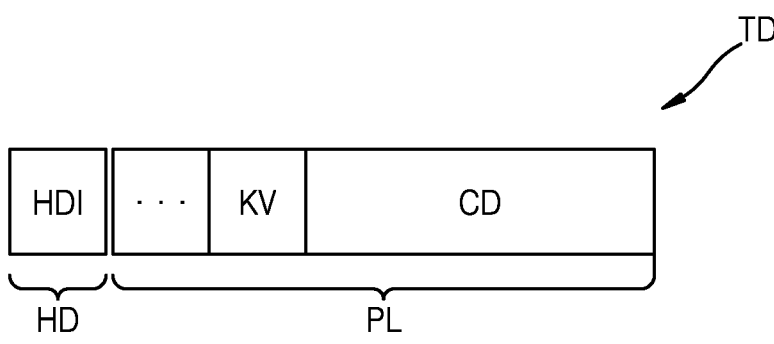
FIG. 8 is a diagram illustrating a transmission structure of compressed data generated in an image processing device according to some implementations.

FIG. 8 is a diagram illustrating a transmission structure of compressed data generated in an image processing device according to some implementations.

The compressor 130 of FIG. 1 may generate transmission data TD including a payload PL and a header HD and transmit the transmission data TD to the memory 200. The payload PL includes compressed data CD. In addition to compressed data CD, the payload PL may further include a parameter related to at least one other compression processing, for example, a KV used when encoding in the encoder 10 of the compressor 130.

The header HD includes a header index HDI, and the header index HDI may indicate a compression ratio (or a size of the compressed data CD) of the compressed data CD. In this case, the header index HDI may be a positive integer, and the header index HDI may be a value representing a data amount of the compressed data CD as a multiple of an access unit of the memory 200.

Figure 9:
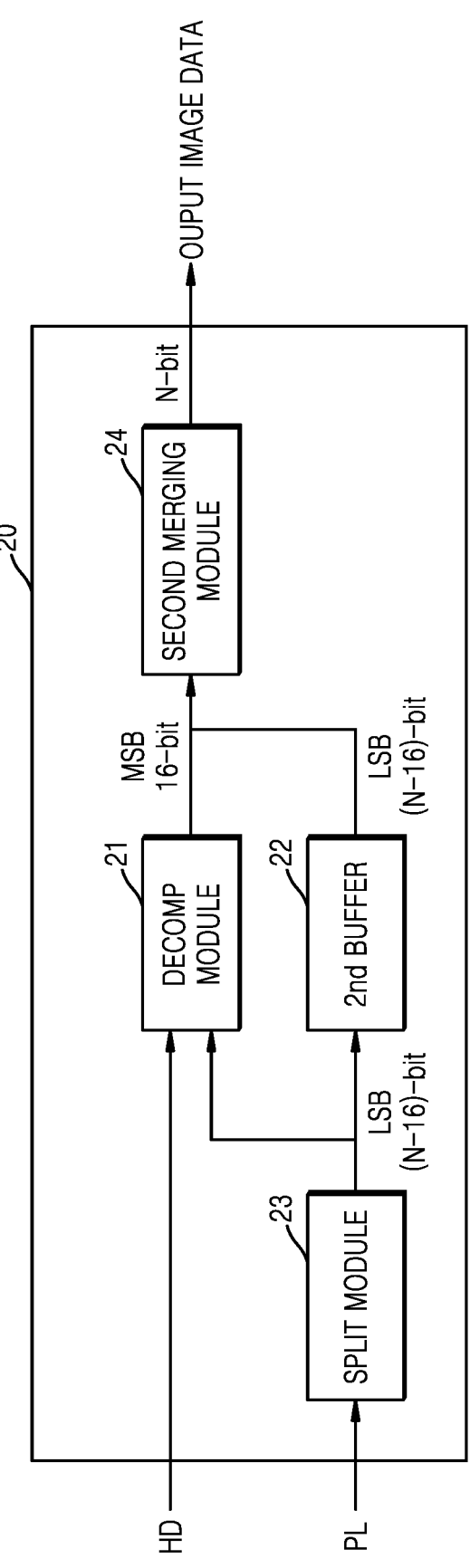
FIG. 9 is a block diagram schematically illustrating a decoder according to some implementations.

FIG. 9 is a block diagram schematically illustrating a decoder according to some implementations.

Specifically, FIG. 9 is a block diagram for describing a decompression operation of image data through the decompression module 21 and the second buffer 22 of the decoder 20 of FIG. 1.

In FIG. 9, it is assumed that the output image data includes N bits, the MSB data in the image data includes 16 bits, and the LSB data of the image data includes (N−16) bits. The most significant bit (MSB) of the image data may be determined as a difference value obtained by subtracting the least significant bit (LSB) of the image data from the total number of bits of the image data. Alternatively, the least significant bit (LSB) of the image data may be determined as a difference value obtained by subtracting the most significant bit (MSB) of the image data from the total number of bits of the image data.

Referring to FIG. 9, for decompression of image data, the decoder 20 includes a decompression module 21, a second buffer 22, a split module 23, and a second merging module 24. Each of the decompression module 21, the second buffer 22, the split module 23, and the second merging module 24 may be implemented in hardware or may be implemented in a combination of hardware and software (or firmware).

The decoder 20 may read compressed data including a header HD and a payload PL from the memory 200.

The split module 23 may split the first compressed data, which is compressed data for the MSB data of image data, and the second image data, which is decompressed data for the LSB data of image data, from the payload PL of compressed data. The split module 23 may transmit the first compressed data to the decompression module 21. In addition, the split module 23 may transmit the second image data to the second buffer 22 to bypass the second image data in the decoder 20.

The decompression module 21 may perform a decompression operation on the MSB data of the image data based on the header HD of the compressed data and the first compressed data. For example, the decompression module 21 may decompress data compressed by the post-compression module 11-3 of FIG. 3. The decompression module 21 may perform decompression through Huffman coding, exponential Golomb coding, or Golomb rice coding. Since the payload PL of the compressed data includes a KV, the decompression module 21 may perform decoding using the KV.

The decompression module 21 may output first restored data by restoring data expressed as prediction data and residual data by the pre-compression module 11-1 of FIG. 3. The decompression module 21 may convert, for example, the residual data expression of (253 (prediction), 1 (residual), 2 (residual)) into the residual data expression of (253, 254, 255). The decompression module 21 may restore predictions performed in units of pixels or areas (blocks) by the pre-compression module 11-1.

The second merging module 24 may combine the first restoration data received from the decompression module 21 with the second image data received from the second buffer 22 to generate output image data and transmit the output image data to the multimedia IP 110 of FIG. 1. Here, the first restoration data may include the MSB data of the image data, and the second image data may include the LSB data of the image data.

The decompression controller of the decoder 20 may receive the header HD received with the payload PL and determine the compression ratio (or size of the compressed data) based on the header index of the header HD.

The decompression controller may also include an entropy table containing KVs determined by the compression controller described above to perform compression in relation to FIG. 3, and may perform an operation that may be properly reflected when decompressing the values of the table.

The decoder 20 according to some implementations may decompress compressed data (e.g., first compressed data) corresponding to the MSB data of image data and bypass data (e.g., second image data) corresponding to the LSB data of the image data, and thus, may reduce data throughput and power consumption generated when performing the decompression operation, thereby preventing performance degradation of the entire image processing device.

Figure 10:
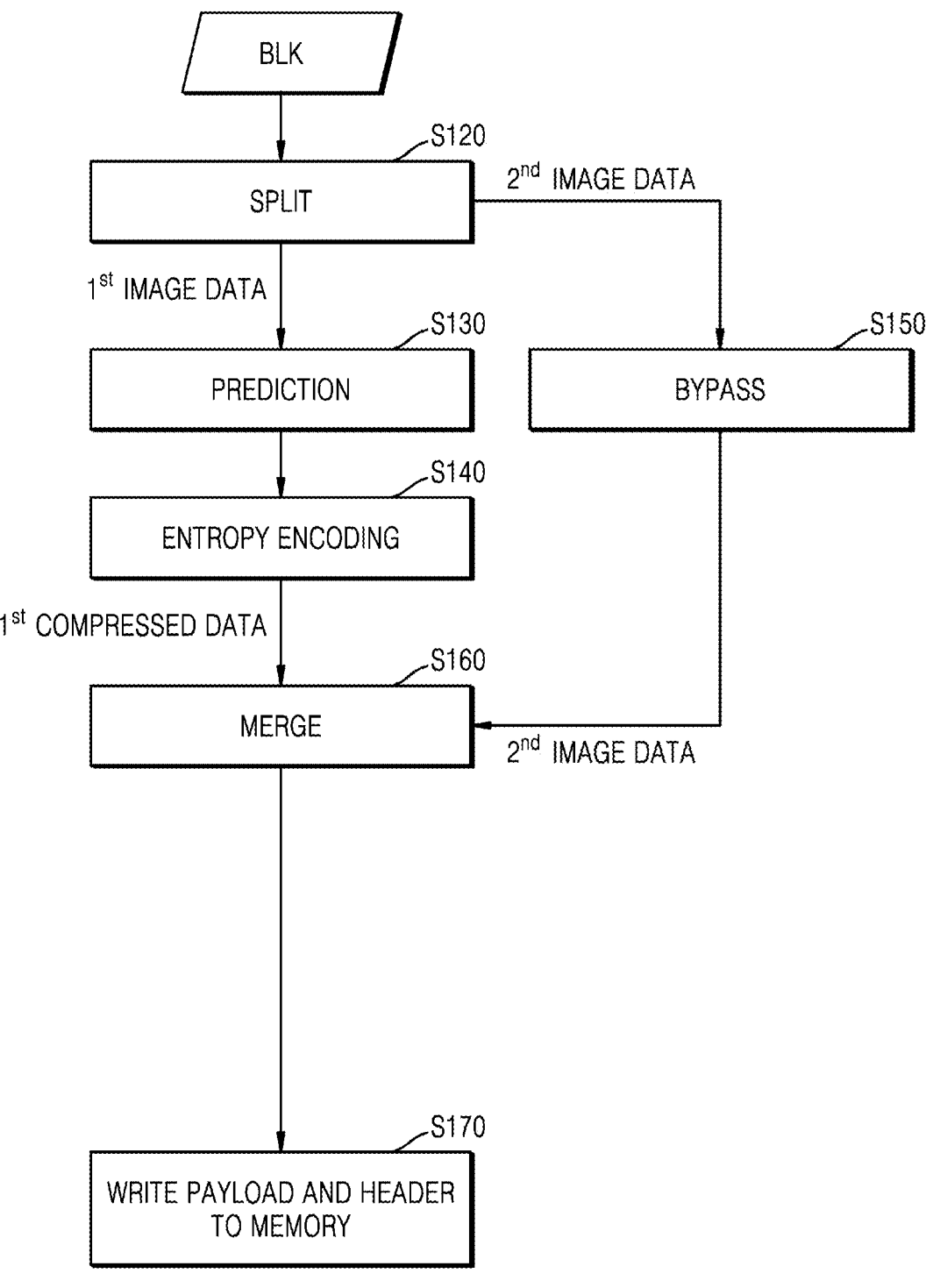
FIG. 10 is a flowchart illustrating a compression method of an image processing device according to some implementations.

FIG. 10 is a flowchart illustrating a compression method of an image processing device according to some implementations.

Specifically, FIG. 10 is a flowchart for illustrating a compression method for image data by the encoder 10 of FIG. 3. The flowchart of FIG. 10 may be described with reference to the compression module 11, the first buffer 12, the HD generator 13, and the first merging module 14 and the operation thereof, which are described with reference to FIG. 3, and thus a redundant description thereof will be omitted.

Referring to FIGS. 10 and 3, a block BLK of image data may be received in the encoder 10. The encoder 10 may split the block image data into first image data including the MSB data and second image data including the LSB data (S120). The most significant bit (MSB) of the image data may be determined as a difference value obtained by subtracting the least significant bit (LSB) of the image data from the total number of bits of the image data. Alternatively, the least significant bit (LSB) of the image data may be determined as a difference value obtained by subtracting the most significant bit (MSB) of the image data from the total number of bits of the image data.

The pre-compression module 11-1 of the compression module 11 may perform predictive processing on the first image data including the MSB data (S130). As described above, the pre-compression module 11-1 may express pixels by dividing the pixels into prediction data and residual data in units of pixel or area (block). For example, the pre-compression module 11-1 may express the first image data by dividing the first image data in pixel units or area (block) units into prediction data and residual data.

The post-compression module 11-3 of the compression module 11 may generate first compressed data by performing entropy encoding on the output of the pre-compression module 11-1, for example, the first image data (or residual data of the first image data) (S140).

The encoder 10 may store the second image data in the first buffer 12 to bypass the second image data in the encoder 10 (S150).

The first merging module 14 of the encoder 10 may generate a payload by merging the first compressed data received from the compression module 11 with the second image data received from the first buffer 12 (S160).

The encoder 10 may write a payload including first compressed data and second image data, and a header including a header index for the first compressed data into the memory 200 of FIG. 1. The header index may represent a compression ratio (or a size of the first compressed data) of the first compressed data.

Figure 11:
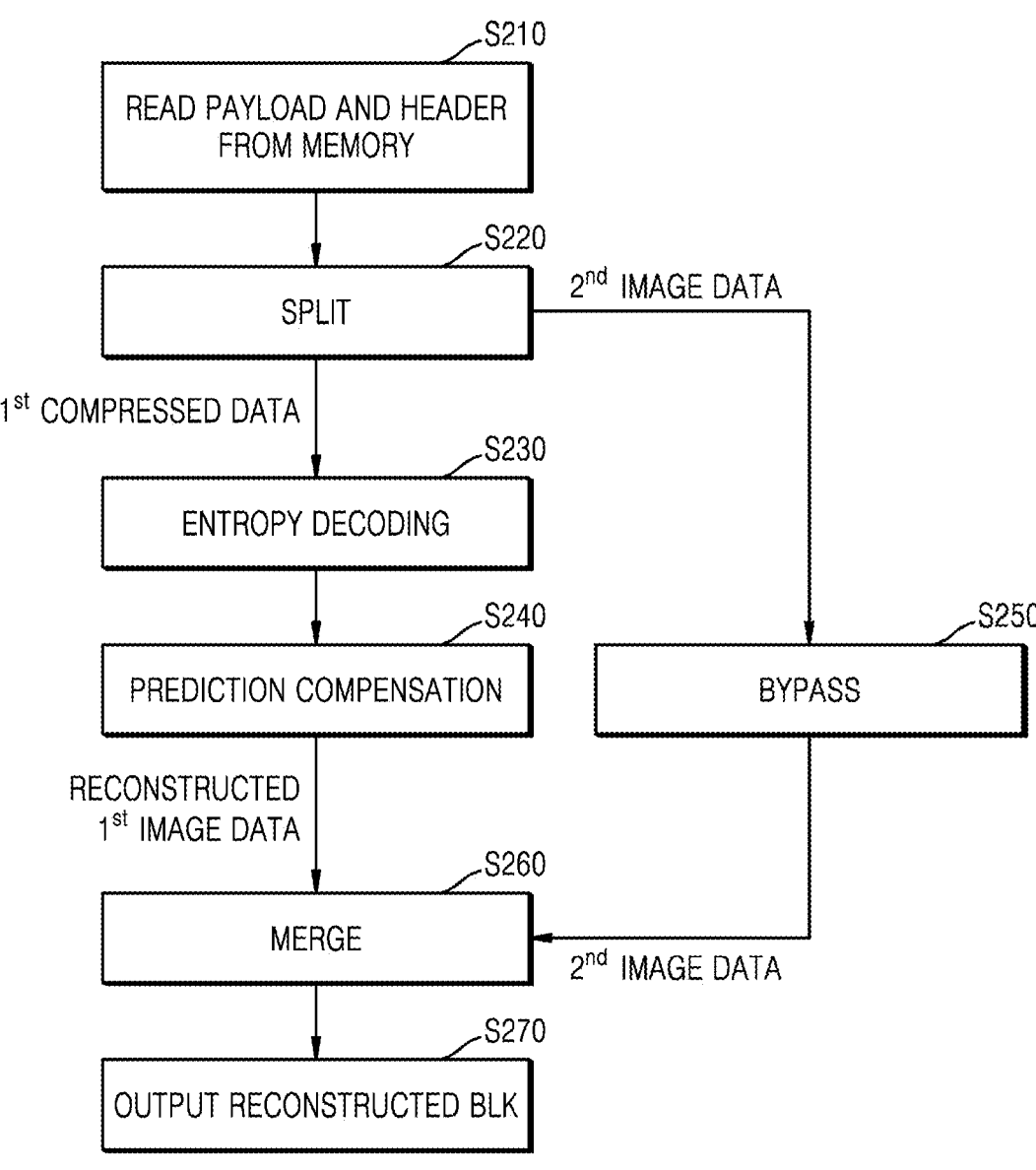
FIG. 11 is a flowchart illustrating a decompression method of an image processing device according to some implementations.

FIG. 11 is a flowchart illustrating a decompression method of an image processing device according to some implementations.

In detail, FIG. 11 is a diagram for explaining a decompression method for decompressing the compressed data by the decoder 20 of FIG. 3. The flowchart of FIG. 11 may be described with reference to the decompression module 21, the second buffer 22, the split module 23, and the second merging module 24 and the operations thereof, which are described with reference to FIG. 9, and thus a redundant description thereof will be omitted. The most significant bit (MSB) of the image data may be determined as a difference value obtained by subtracting the least significant bit (LSB) of the image data from the total number of bits of the image data. Alternatively, the least significant bit (LSB) of the image data may be determined as a difference value obtained by subtracting the most significant bit (MSB) of the image data from the total number of bits of the image data.

Referring to FIGS. 11 and 9, the decoder 20 (or the compressor 130 of FIG. 1) may read a payload and a header including compressed data from a memory 200 of FIG. 1 (S210).

The decoder 20 may split the first compressed data and the second image data from the payload of the compressed data (S220). Here, the first compressed data may refer to data in which entropy encoding is performed on the first image data including the MSB data of the block BLK, and the second image data may refer to data in the LSB of the block BLK without entropy encoding.

The decompression module 21 of the decoder 20 may perform entropy decoding on the first compressed data of the payload (S230). The decompression module 21 may perform prediction compensation on the entropy-decoded data (S240). For example, the decompression module 21 may output first compressed data in which entropy decoding has been performed, for example, MSB data (e.g., reconstructed first image data) of the reconstructed block BLK.

The decoder 20 may store the second image data in the second buffer 22 to bypass the second image data in the decoder 20 (S250).

The second merging module 24 of the decoder 20 may generate a reconstructed block BLK (or image data for the reconstructed block BLK) by merging the reconstructed first image data received from the decompression module 21 with the second image data received from the second buffer 22 (S260).

The decoder 20 may output the reconstructed block BLK (or image data for the reconstructed block BLK) to the multimedia IP 110 of FIG. 1 (S270).

Figure 12:
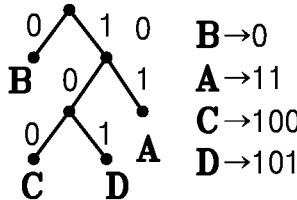
FIG. 12 is a diagram illustrating an operation of an image processing device and an effect thereof, according to some implementations.

FIG. 12 is a diagram illustrating an operation of an image processing device and an effect thereof according to some implementations.

In detail, FIG. 12 is a diagram illustrating a data compression operation through entropy encoding according to some implementations and a compression effect thereby.

Referring to FIG. 12, it is assumed that the frequency of occurrence (i.e., probability of occurrence) of "A" is $\frac{1}{3}$, the frequency of occurrence of "B" is $\frac{1}{2}$, the frequency of occurrence of "C" is $\frac{1}{12}$, and the frequency of occurrence of "D" is $\frac{1}{12}$. In addition, FIG. 12 assumes that the encoder 10 according to some implementations performs entropy encoding on the symbol "010011011101."

First, the encoder 10 according to some implementations may encode the data having a higher frequency of occurrence into fewer bits through entropy encoding. For example, the entropy encoding value of "A" may be "11" (2-bit), the entropy encoding value of "B" may be "0" (1-bit), the entropy encoding value of "C" may be "100" (3-bit) and the entropy encoding value of "D" may be "101" (3-bit). For example, when entropy encoding is performed on the symbol by the encoder 10, the expected data length may be $(2)*(\frac{1}{3})+(1)*(\frac{1}{2})+(3)*(\frac{1}{12})*(2)=1.667$ bits.

Meanwhile, the encoder according to a comparative example may encode the symbol "010011011101" with bits of the same size for each data through a fixed bit rate encoding (or a fixed-length encoding). For example, the fixed bit rate encoding value of "A" may be "00" (2-bit), the fixed bit rate encoding value of 'B' may be "01" (2-bit), the fixed bit rate encoding value of "C" may be "10" (2-bit), and the fixed bit rate encoding value of "D" may be "11" (2-bit). For example, when entropy encoding is performed on the symbol by the encoder 10 according to the comparison example, the expected data length may be $(2)*(\frac{1}{3})+(2)*(\frac{1}{2})+(2)*(\frac{1}{12})*(2)=2$ bits.

Assuming that the entire image data includes 1000 symbols, the expected data length in the comparative example is 2000 bits. In comparison, in some implementations, the expected data length is 1667 bits, in which the data length significantly decreases compared to the comparative example, resulting in efficient data compression by reducing power consumption and data throughput compared to a comparative example.

FIG. 13A shows a table comparing the compression ratio of LSB according to some implementations, and FIG. 13B shows a table comparing performance according to a configuration of an encoder according to some implementations.

Referring to FIG. 13A, a table for comparing compression ratios for each size of the LSB with respect to image data is illustrated. In FIG. 13A, it is assumed that the size of the image data is 24 bits.

In some implementations, the compression ratio for the image data may be calculated based on Equation 1 below.

$$\text{Compression ratio (\%)} = \left(1 - \left(comp\ size/umcomp\ size\right)\right)*100 \quad \text{[Equation 1]}$$

Therefore, the encoder 10 of FIG. 1 (or the compression module 11 of FIG. 3) according to some implementations may perform efficient compression by performing compression around the MSB of image data having high correlation between peripheral pixels. In addition, the encoder 10 of FIG. 1 (or the compression module 11 of FIG. 3) according to some implementations may reduce a hardware installation area and reduce power consumption and data throughput due thereto, by skipping compression for the MSB of image data having low correlation between peripheral pixels.

Therefore, the encoder 10 of FIG. 3 (or the compression module 11 of FIG. 3) according to some implementations may perform efficient compression by performing compression around the MSB of image data having high correlation between peripheral pixels. In addition, the encoder 10 of FIG. 3 (or the compression module 11 of FIG. 3) according to some implementations may reduce a hardware installation area and reduce power consumption and data throughput due thereto, by skipping compression for the MSB of image data having low correlation between peripheral pixels.

Referring to FIG. 13B, a table for comparing compression ratios according to a variation of a hardware configuration of an encoder according to some implementations or a configuration of an LSB compared to an MSB is shown. In FIG. 13B, the size of image data is assumed to be 24 bits, and for convenience of description, the most significant bit of the image data may be referred to as "MSB," and the least significant bit of the image data may be referred to as "LSB." Here, the MSB may be determined as a difference value obtained by subtracting the LSB of the image data from the total number of bits of the image data. Alternatively, the LSB of the image data may be determined as a difference value obtained by subtracting the MSB of the image data from the total number of bits of the image data.

In some implementations, the compression ratio for the image data may be calculated based on Equation 1 of FIG. 13A described above.

In some implementations, in the first case, compression may be performed using an encoder consisting of one core and one bypass buffer of 8-bit. In the first case, the 16-bit MSB may be compressed by the core, and the 8-bit LSB may be stored while skipping compression by the bypass buffer (8-bit). In this case, the compression ratio in the first case may be calculated as 25.19 based on Equation 1. In the first case, there is little difference in the compression ratio compared to the second and third cases, and the size of the hardware configuration is the smallest, and thus compression efficiency may be relatively high.

In some implementations, in the second case, compression may be performed using an encoder consisting of one core and one bypass buffer of 12-bit. In the second case, the 12-bit MSB may be compressed by the core, and the 12-bit LSB may be stored while skipping compression by the bypass buffer (12-bit). In this case, the compression ratio in the second case may be calculated as 25.21 based on Equation 1. The second case may have lower compression efficiency compared to the first case in that a remarkable difference in the compression ratio of the second case does not occur compared to that of the first case.

In some implementations, in the third case, compression may be performed using an encoder including a first core and a second core (a total of two cores). In the third case, the 12-bit MSB may be compressed by the first core, and the 12-bit LSB may be stored while skipping compression by the second core. In this case, the compression ratio in the third case may be calculated as 26.31 based on Equation 1. The third case has the highest compression ratio, but there is no significant difference compared to the first and second cases, and the compression efficiency of the third case may be lower than those of the first and second cases in that two cores should be used.

Therefore, considering the size and compression efficiency of the hardware configuration, the encoder according to some implementations may include a hardware configuration in the first case (including one core and one bypass buffer (8-bit)). However, some implementations are not limited thereto, and the encoder according to some implementations may be implemented with various hardware configurations.

Figure 14:
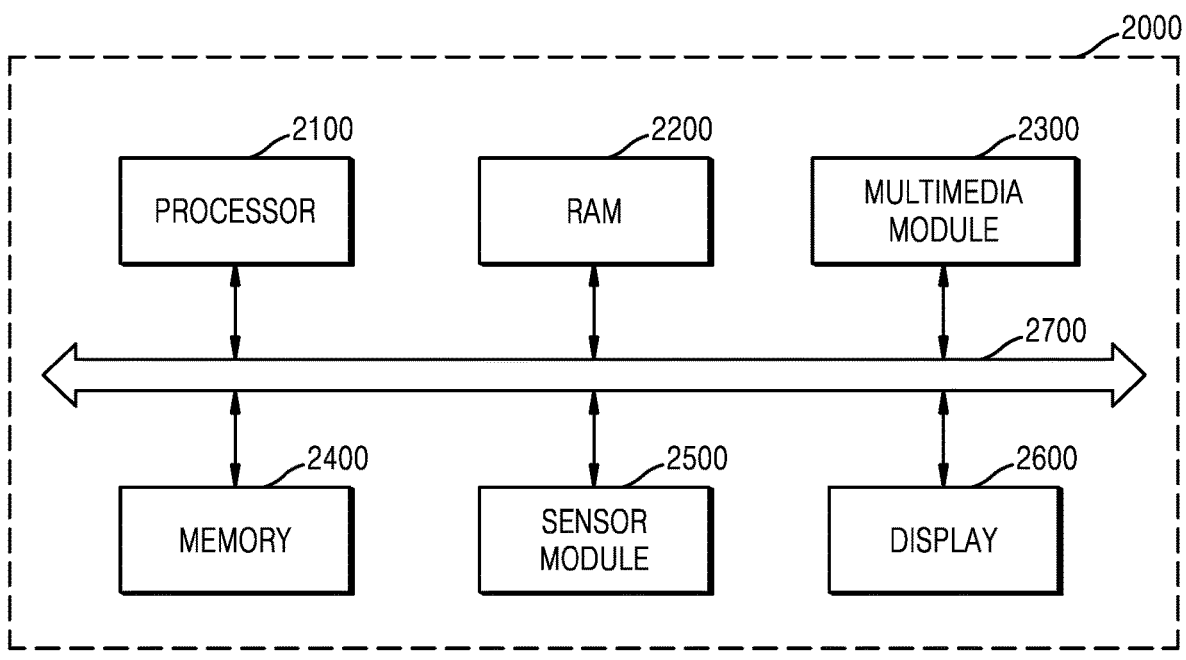
FIG. 14 is a block diagram schematically illustrating an electronic system including a multimedia module according to some implementations.

FIG. 14 is a block diagram schematically illustrating an electronic system including a multimedia module according to some implementations.

The electronic system 2000 may be applied to a camera, a smartphone, a smart TV, a wearable device, an Internet of Things (IoT), a tablet Personal Computer (PC), a Personal Digital Assistant (PDA), a Portable Multimedia Player (PMP), a navigation device, and a measurement device, and may be applied to a robot device such as a drone and an advanced drivers assistance system (ADAS). In addition, the electronic system 2000 may be applied to a device that performs image processing.

Referring to FIG. 14, the electronic system 2000 may include a processor 2100, a RAM 2200, a multimedia module 2300, a memory 2400, a sensor module 2500, a display 2600, and a bus 2700. In addition, the electronic system 2000 may further include other general-purpose components such as a communication module and a read only memory (ROM). The processor 2100, the RAM 2200, the multimedia module 2300, the memory 2400, the sensor module 2500, and the display 2600 may transmit and receive data to and from each other through the bus 2700. In some implementations, some components, such as the processor 2100, the RAM 2200, and the multimedia module 2300, may be implemented as a system-on-chip (SoC), for example, the system-on-chip (SoC) may be an application processor.

The processor 2100 may control the overall operation of the electronic system 2000. The processor 2100 may include a single core or multi-cores. The processor 2100 may process or execute programs and/or data stored in the memory 2400.

The RAM 2200 may temporarily store programs, data, and/or instructions. According to some implementations, the RAM 2200 may be implemented as DRAM or SRAM. The RAM 2200 may temporarily store data generated by the processor 2100 or the multimedia module 2300 or data to be transmitted to the processor 2100 or the multimedia module 2300. In some implementations, the RAM 2200 may be used as a memory of the multimedia module 2300, for example, the internal memory 120 of FIG. 1.

The multimedia module 2300 may perform image processing on the received image data, compress the image-processed image data and store the compressed image data in the memory 2400, or transmit the image-processed image data to the display 2600.

The multimedia module 100 of FIG. 1 may be applied as the multimedia module 2300. Descriptions of the multimedia module 100 and components provided in the multimedia module 100 described above may be applied to the present implementation.

The multimedia module 2300 may include at least one multimedia IP that performs image processing and a compressor that compresses or decompresses image data. According to some implementations described above, the compressor performs compression and/or decompression operations on the MSB of image data, and compression and/or decompression operations on the LSB of the image data may be skipped and bypassed. The compressor may transmit, to the memory 2400, a payload including compressed data and a header including a header index indicating the compression ratio (or size of compressed data) of the compressed data.

The memory 2400 may be implemented as a volatile memory such as DRAM or SRAM, or a nonvolatile memory such as ReRAM, PRAM, or NAND flash. The memory 2400 may be implemented as a memory card such as a multimedia card (MMC), an embedded MMC (eMMC), a secure digital (SD) card, a microSD, etc.

The memory 2400 may store programs and/or data. In some implementations, the memory 2400 may store image data and/or compressed image data. The memory 2400 may store compressed data and headers received from the multimedia module 2300 according to a write request from the multimedia module 2300, and transmit the compressed data and headers to the multimedia module 2300 according to a read request from the multimedia module 2300. In some implementations, the compressed data and the header may be transmitted between the memory 2400 and the multimedia module 2300 through the DMA circuit.

The sensor module 2500 may include at least one sensor, such as an image sensor, a voice sensor, an acceleration/gyro sensor, an infrared sensor, a touch sensor, a fingerprint sensor, a proximity sensor, etc. In some implementations, the sensor module 2500 may include an image sensor, and image data generated from the image sensor may be stored in the memory 2400 or transmitted to the multimedia module 2300.

The display module 2600 may include a display such as a liquid-crystal display (LCD) and an active matrix organic light emitting diode (AMOLED) display, and may output, through a display, an image corresponding to the image data by driving the display based on the image data received from the sensor module 2500 or multimedia module 2300.

While this disclosure contains many specific implementation details, these should not be construed as limitations on the scope of what may be claimed. Certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially be claimed as such, one or more features from a combination can in some cases be excised from the combination, and the combination may be directed to a subcombination or variation of a subcombination While the inventive concept has been particularly shown and described with reference to some implementations thereof, it will be understood that various changes in form and details may be made therein without departing from the spirit and scope of the following claims.

What is claimed is:

1. An image processing device comprising:
a memory;
a multimedia circuit configured to process image data for pixels constituting one frame image; and
an encoder configured to generate compressed data by performing compression on the image data, wherein the encoder comprises a compression circuit, a header generator, and a first buffer,
wherein the compression circuit is configured to generate first compressed data by performing compression on first image data, the first image data including a most significant bit (MSB) of the image data,
wherein the first buffer is configured to store second image data that is free of a compression operation, the second image data containing a least significant bit (LSB) of the image data,
wherein the header generator is configured to receive the first compressed data from the compression circuit and output a header comprising a header index indicating a compression ratio of the first compressed data,
wherein the encoder further comprises a first merging circuit,
wherein the first merging circuit is configured to:
receive the first compressed data from the compression circuit;
receive the second image data from the first buffer;
generate a payload by merging the first compressed data with the second image data; and
transmit, to the memory, the payload including the first compressed data and the second image data, and the header.

2. The image processing device of claim 1, wherein the compression circuit is further configured to:
perform a prediction operation on the first image data to form residual data; and
generate the first compressed data by performing compression on the residual data corresponding to the first image data.

3. The image processing device of claim 1, wherein the compression circuit comprises a pre-compression circuit and a post-compression circuit, wherein the pre-compression circuit is configured to determine a compression parameter corresponding to each of a plurality of blocks included in the first image data, and wherein the post-compression circuit is configured to generate the first compressed data by performing compression on each of the plurality of blocks included in the first image data based on the compression parameter.

4. The image processing device of claim 1, wherein the header index has a positive integer value representing an amount of data of the first compressed data as a value corresponding to a multiple of an access unit of the memory, the MSB of the image data is determined by a value of a difference of the LSB of the image data from a total number of bits of the image data, or the LSB of the image data is determined by a value of a difference of the MSB of the image data from the total number of bits of the image data.

5. The image processing device of claim 1, further comprising a decoder including a decompression circuit and a second buffer, wherein the decompression circuit is configured to read the payload and the header from the memory and decompress the payload.

6. The image processing device of claim 5, wherein the decompression circuit is further configured to:

split the first compressed data and the second image data from the payload, and perform decompression of the first compressed data based on the header index to restore the first image data, and wherein the second buffer is configured to store the second image data that is free of decompression operation.

7. The image processing device of claim 6, wherein the decoder further comprises a second merging circuit that is configured to:

receive the first image data from the decompression circuit;

receive the second image data from the second buffer; and transmit, to the multimedia circuit, decompressed data generated by merging the first image data with the second image data.

8. A method for processing image data for pixels constituting one frame image, the method comprising:

generating first compressed data by performing compression on first image data including a most significant bit (MSB) of the image data;

storing, in a first buffer, second image data including a least significant bit (LSB) of the image data that is free of compression operation;

generating a payload by merging the first compressed data with the second image data;

generating a header comprising a header index indicating a compression ratio of the first compressed data; and storing, in a memory, the payload including the first compressed data and the second image data, and the header.

9. The method of claim 8, wherein generating the first compressed data comprises:

performing a prediction operation on the first image data to form residual data; and generating the first compressed data by performing compression on the residual data corresponding to the first image data.

10. The method of claim 8, wherein generating the first compressed data comprises:

determining a compression parameter corresponding to each of a plurality of blocks included in the first image data; and generating the first compressed data by performing compression on each of the plurality of blocks included in the first image data, based on the compression parameter.

11. The method of claim 8, wherein the header index has a positive integer value representing an amount of data of the first compressed data as a value corresponding to a multiple of an access unit of the memory, the MSB of the image data is determined by a value of difference of the LSB of the image data from a total number of bits of the image data, or the LSB of the image data is determined by a value of difference of the MSB of the image data from the total number of bits of the image data.

12. The method of claim 8, further comprising decompressing the payload by reading the payload and the header from the memory.

13. The method of claim 12, wherein decompressing the payload comprises:

splitting the first compressed data and the second image data from the payload;

performing decompression of the first compressed data, based on the header index, to restore the first compressed data as the first image data; and storing the second image data free of compression operation in a second buffer.

14. The method of claim 13, further comprising generating decompressed data by merging the restored first image data with the stored second image data.

15. An image processing device comprising:

a memory; and a multimedia circuit configured to process image data for pixels constituting one frame image, wherein the multimedia circuit is configured to:

perform compression on first image data including a most significant bit (MSB) of the image data to generate compressed first image data, skip compression on second image data including a least significant bit (LSB) of the image data, generate a header comprising a header index indicating a compression ratio of the compressed first image data, generate a payload by merging the compressed first image data with the second image data, and write, in the memory, compressed data including the payload and the header.

16. The image processing device of claim 15, wherein the multimedia circuit is configured to:

read the compressed data from the memory;

split the compressed first image data and the second image data from the compressed data;

perform restoration on the compressed first image data based on the header index;

skip decompression for the second image data; and generate decompressed data by merging the restored first image data with the second image data.

* * * * *